US012545862B2

(12) United States Patent
Nakazaki et al.

(10) Patent No.: US 12,545,862 B2
(45) Date of Patent: Feb. 10, 2026

(54) METHOD FOR PRODUCING DECOMPOSING/CLEANING COMPOSITION

(71) Applicant: SHOWA DENKO K.K., Tokyo (JP)

(72) Inventors: Susumu Nakazaki, Tokyo (JP); Kuniaki Miyahara, Tokyo (JP)

(73) Assignee: Resonac Corporation, Tokyo (JP)

( * ) Notice: Subject to any disclaimer, the term of this patent is extended or adjusted under 35 U.S.C. 154(b) by 796 days.

(21) Appl. No.: 17/774,025

(22) PCT Filed: Oct. 23, 2020

(86) PCT No.: PCT/JP2020/039997
§ 371 (c)(1),
(2) Date: May 3, 2022

(87) PCT Pub. No.: WO2021/106460
PCT Pub. Date: Jun. 3, 2021

(65) Prior Publication Data

US 2022/0380704 A1 Dec. 1, 2022

(30) Foreign Application Priority Data

Nov. 25, 2019 (JP) ................................ 2019-212251

(51) Int. Cl.
*C11D 7/32* (2006.01)
*C11D 7/26* (2006.01)

(52) U.S. Cl.
CPC ............ *C11D 7/3263* (2013.01); *C11D 7/263* (2013.01); *C11D 2111/18* (2024.01)

(58) Field of Classification Search
CPC ......... C11D 7/32; C11D 7/3264; C11D 7/263; C11D 2111/00; C11D 2111/16
See application file for complete search history.

(56) References Cited

U.S. PATENT DOCUMENTS

| | | | | |
|---|---|---|---|---|
| 2,880,219 | A * | 3/1959 | Burnette | A61Q 5/02 554/49 |
| 3,673,099 | A | 6/1972 | Corby et al. | |
| 4,428,871 | A | 1/1984 | Ward et al. | |
| 4,744,834 | A | 5/1988 | Haq | |
| 6,576,734 | B1 * | 6/2003 | Matsuo | C08G 77/38 556/440 |
| 6,660,460 | B2 * | 12/2003 | Sahbari | G03F 7/426 510/274 |
| 11,732,214 | B2 * | 8/2023 | Ogino | H01L 21/304 510/504 |
| 11,787,908 | B2 * | 10/2023 | Joffre | C09J 183/06 528/13 |
| 11,866,676 | B2 * | 1/2024 | Ogino | C09J 7/30 |
| 2004/0084060 | A1 * | 5/2004 | Zhu | C07C 227/18 134/40 |
| 2014/0357052 | A1 | 12/2014 | Ueno et al. | |
| 2017/0158888 | A1 * | 6/2017 | Kang | C09D 9/005 |
| 2020/0165547 | A1 | 5/2020 | Takahashi et al. | |
| 2022/0154104 | A1 * | 5/2022 | Okuno | C11D 1/90 |

FOREIGN PATENT DOCUMENTS

| | | | |
|---|---|---|---|
| TW | 200505975 | A | 2/2005 |
| TW | 201510214 | A | 3/2015 |
| TW | 201912776 | A | 4/2019 |
| WO | 2004/094581 | A1 | 11/2004 |
| WO | 2020/166702 | A1 | 8/2020 |

OTHER PUBLICATIONS

Bing Xu, et al., "Making Honeycomb Microcomposites by Soft Lithography", Advanced Materials, 1999, pp. 492-495, vol. 11, No. 6.
Shuichi Takayama, et al., "Topographical Micropatterning of Poly (dimethylsiloxane) Using Laminar Flows of Liquids in Capillaries", Advanced Materials, Apr. 18, 2001, pp. 570-574, vol. 13, No. 8.
Maya Kleiman, et al., "Determination of Factors Influencing the Wet Etching of Polydimethylsiloxane Using Tetra-n-butylammonium Fluoride", Macromolecular Chemistry and Physics, 2016, pp. 284-291, vol. 217.
International Search Report for PCT/JP2020/039997 dated Jan. 19, 2021.
Written Opinion for PCT/JP2020/039997 dated Jan. 19, 2021.

* cited by examiner

*Primary Examiner* — Michael E Barr
(74) *Attorney, Agent, or Firm* — Sughrue Mion, PLLC

(57) ABSTRACT

Provided is a method for producing a decomposing/cleaning composition which improves etching speed retention. In particular, a method for producing a decomposing/cleaning composition which contains (A) an N-substituted amide compound in which a hydrogen atom is not directly bonded to a nitrogen atom and (B) a quaternary alkyl ammonium fluoride or a hydrate thereof is provided, the method having a preparation step for mixing the (A) and (B) components in an inert gas atmosphere.

18 Claims, No Drawings

METHOD FOR PRODUCING DECOMPOSING/CLEANING COMPOSITION

CROSS REFERENCE TO RELATED APPLICATIONS

This application is a National Stage of International Application No. PCT/JP2020/039997 filed Oct. 23, 2020, claiming priority based on Japanese Patent Application No. 2019-212251 filed Nov. 25, 2019.

FIELD

The present disclosure relates to a method for producing a decomposing cleaning composition. In particular, the present disclosure relates to a method for producing a composition that can be used for decomposing and cleaning an adhesive including an adhesive polymer used for temporary bonding between a device wafer and a support wafer (carrier wafer), the adhesive remaining on the device wafer in a thinning process of a semiconductor wafer.

BACKGROUND

In a three-dimensional mounting technology for densifying semiconductors, the thicknesses per sheet of semiconductor wafers are reduced, and a plurality of semiconductor wafers connected by a through silicon via (TSV) are stacked. Specifically, after thinning a device wafer having a semiconductor device formed thereon by polishing a surface (back surface) on which the semiconductor device is not formed, an electrode including a TSV is formed on the back surface.

In the polishing step of the back surface of the device wafer, in order to impart mechanical strength to the device wafer, a support wafer, also referred to as a carrier wafer, is temporarily bonded using an adhesive on a surface on which the semiconductor device is formed of the device wafer. For example, a glass wafer or a silicon wafer is used as the support wafer. After the polishing step, a metal wiring or an electrode pad containing Al, Cu, Ni, Au, etc., an inorganic film, such as an oxide film or a nitride film, or a resin layer containing a polyimide, etc., is formed on the polished surface (back surface) of the device wafer, as necessary. Thereafter, the device wafer is fixed to a tape, which has an acrylic adhesive layer and is secured by a ring frame, by attaching the back surface of the device wafer to the tape. The device wafer is then separated from the support wafer (debonding), the adhesive on the device wafer is peeled off, and the adhesive residue on the device wafer is cleaned off using a cleaning agent.

An adhesive including a polyorganosiloxane compound having good heat resistance as an adhesive polymer is used for temporary bonding application of a device wafer. In particular, when the adhesive is a crosslinked polyorganosiloxane compound, two actions of cleavage of an Si—O bond and dissolution of a decomposed product by a solvent are required for a cleaning agent. Examples of such a cleaning agent include those obtained by dissolving a fluorine-based compound, such as tetrabutylammonium fluoride (TBAF) in a polar aprotic solvent. Since a fluoride ion of TBAF participates in the cleavage of an Si—O bond via Si—F bond formation, the cleaning agent can be provided with etch performance. Since the polar aprotic solvent can dissolve TBAF and does not form solvation via a hydrogen bonding with the fluoride ion, the reactivity of the fluoride ion can be increased.

In Non-Patent Literature 1 (Advanced Materials, 11, 6, 492 (1999)), a 1.0 M TBAF solution using THF, which is aprotic, as a solvent is used for decomposing, and dissolving and removing polydimethylsiloxane (PDMS).

In Non-Patent Literature 2 (Advanced Materials, 13, 8, 570 (2001)), NMP, DMF and DMSO, which are an aprotic solvent as with THF, are used as a solvent of TBAF.

Non-Patent Literature 3 (Macromolecular Chemistry and Physics, 217, 284-291 (2016)) describes results of examining PDMS etch rates with TBAF/organic solvents for each solvent, and also describes, with respect to THF and DMF, which have a high etch rate, a comparison of etch rates of TBAF solutions using mixed solvents having different ratios of THF/DMF.

CITATION LIST

Non-Patent Literature

[NPL 1] Advanced Materials, 11, 6, 492 (1999)
[NPL 2] Advanced Materials, 13, 8, 570 (2001)
[NPL 3] Macromolecular Chemistry and Physics, 217, 284-291 (2016)

SUMMARY

Technical Problem

It is considered that the role of a solvent in a decomposing cleaning composition containing a fluorine compound, such as TBAF, and the solvent is to sufficiently dissolve the fluorine compound which is highly polar and a reactive substance, and to dissolve a decomposed product of the adhesive while ensuring the reactivity of fluoride ions included in the fluorine compound.

The present inventors have found that, even when an aprotic N-substituted amide compound is used as the solvent in order to sufficiently dissolve a fluorine compound which is highly polar, and ensure the reactivity of fluoride ions included in the fluorine compound, the etch rate of the decomposing cleaning composition may decrease with the lapse of the storage period after preparation of the decomposing cleaning composition.

It is an object of the present disclosure to provide a method for producing a decomposing cleaning composition which improves the retention rate of the etch rate.

Solution to Problem

The present inventors have found that a decrease in etch rate can be suppressed by mixing a quaternary alkylammonium fluoride or a hydrate thereof, and an N-substituted amide compound in which no hydrogen atom is directly bonded to a nitrogen atom under an inert gas atmosphere.

That is, the present invention includes the following [1] to [14].

[1] A method for producing a decomposing cleaning composition comprising (A) an N-substituted amide compound in which no hydrogen atom is directly bonded to a nitrogen atom, and (B) a quaternary alkylammonium fluoride or a hydrate thereof, the method comprising a preparation step of mixing the (A) and the (B) under an inert gas atmosphere.

[2] The method for producing the decomposing cleaning composition according to [1], wherein the decomposing cleaning composition further comprises (C) an ether compound, and wherein the method comprises a preparation step of mixing the (A) to the (C) under an inert gas atmosphere.

[3] The method for producing the decomposing cleaning composition according to [1] or [2], wherein the inert gas in the preparation step is nitrogen gas.

[4] The method for producing the decomposing cleaning composition according to any one of [1] to [3], comprising an encapsulation step of enclosing the prepared decomposing cleaning composition in a container under an inert gas atmosphere after the preparation step.

[5] The method for producing the decomposing cleaning composition according to [4], wherein the inert gas in the encapsulation step is nitrogen gas.

[6] The method for producing the decomposing cleaning composition according to any one of [1] to [5], wherein the (A) N-substituted amide compound is a 2-pyrrolidone derivative compound represented by the formula (1):

(1)

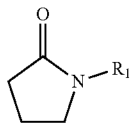

wherein, in the formula (1), $R^1$ represents an alkyl group having 1 to 4 carbon atoms.

[7] The method for producing the decomposing cleaning composition according to [6], wherein the (A) N-substituted amide compound is a 2-pyrrolidone derivative compound wherein $R^1$ in the formula (1) is a methyl group or an ethyl group.

[8] The method for producing the decomposing cleaning composition according to [2], wherein the (C) ether compound comprises a dialkyl ether of glycol represented by the formula (2):

$$R^2O(C_nH_{2n}O)_xR^3 \quad (2),$$

wherein, in the formula (2), $R^2$ and $R^3$ each independently represent an alkyl group selected from the group consisting of a methyl group, an ethyl group, a propyl group, an isopropyl group, an n-butyl group, an isobutyl group, a sec-butyl group, and a t-butyl group, n is 2 or 3, and x is an integer of 1 to 4.

[9] The method for producing the decomposing cleaning composition according to [8], wherein the dialkyl ether of glycol is dipropylene glycol dimethyl ether.

[10] The method for producing the decomposing cleaning composition according to any one of [2], [8] or [9], wherein the (C) ether compound comprises a dialkyl ether represented by the formula (3):

$$R^4OR^5 \quad (3),$$

wherein, in the formula, $R^4$ and $R^5$ each independently represent an alkyl group having 4 to 8 carbon atoms.

[11] The method for producing the decomposing cleaning composition according to [10], wherein the dialkyl ether is dibutyl ether.

[12] The method for preparing the decomposing cleaning composition according to any one of [1] to [11], wherein the (B) quaternary alkylammonium fluoride is a tetraalkylammonium fluoride represented by $R^6R^7R^8R^9N^+F^-$, wherein $R^6$ to $R^9$ are each independently an alkyl group selected from the group consisting of a methyl group, an ethyl group, an n-propyl group, an isopropyl group, and an n-butyl group.

[13] The method for producing the decomposing cleaning composition according to any one of [1] to [12], wherein the decomposing cleaning composition is a decomposing cleaning composition for an adhesive polymer.

[14] The method for producing the decomposing cleaning composition according to [13], wherein the adhesive polymer is a polyorganosiloxane compound.

Advantageous Effects of Invention

The method for producing a decomposing cleaning composition of the present disclosure can improve the retention rate of the etch rate. This is advantageous for long-term storage of the decomposing cleaning composition.

The foregoing description should not be considered as disclosing all embodiments of the present invention and all advantages thereof.

DESCRIPTION OF EMBODIMENTS

Hereinafter, the present invention will be described in further detail. Note that the present invention is not limited to only the embodiments described below.

A decomposing cleaning composition produced by the production method of the present disclosure comprises an N-substituted amide compound in which no hydrogen atom is directly bonded to a nitrogen atom (also simply referred to as "N-substituted amide compound" in the present disclosure) as a solvent. It is known that the N-substituted amide compound is gradually oxidized by contact with oxygen to produce an oxide. For example, N-methylpyrrolidone (NMP) is oxidized to generate NMP derivatives, including N-methylsuccinimide. Since this oxidation product of the N-substituted amide compound generates a product having a hydrogen atom which is active against fluoride ions in the decomposing cleaning composition, it is considered that the activity of the fluoride ion is deteriorated, and as a result, the etch rate decreases with time. Therefore, it is considered that suppressing the oxidation of the N-substituted amide compound is desirable in order to maintain the etch rate.

Incidentally, the production steps of the decomposing cleaning composition has steps, such as storage of a raw material, charge of the raw material into a mixing tank, addition of a solvent, stirring and mixing, filling, and storage. Since these steps are usually carried out under an air atmosphere, oxygen is dissolved in a solvent, and the dissolved oxygen gradually oxidizes the solvent. Therefore, it is desirable to reduce the dissolution of oxygen in a solvent. From this viewpoint, in particular, it is important to sufficiently reduce the oxygen concentration of the gas phase in the stirring and mixing step in which the contact frequency of the gas phase and the liquid phase is high. In particular, since a quaternary alkylammonium fluoride or a hydrate thereof is solid, it is necessary to vigorously stir in order to pulverize and dissolve the quaternary alkylammonium fluoride or the hydrate thereof. Therefore, when stirring is carried out under an air atmosphere, the dissolution rate of oxygen increases, and even if a subsequent step is carried out under a nitrogen gas atmosphere, the oxidation of the solvent proceeds due to dissolved oxygen, so that the etch rate decreases with time.

A method for producing a decomposing cleaning composition of one embodiment comprises a preparation step of mixing (A) an N-substituted amide compound in which no hydrogen atom is directly bonded to a nitrogen atom, and (B) a quaternary alkylammonium fluoride or a hydrate thereof under an inert gas atmosphere.

[Decomposing Cleaning Composition]

<(A) N-Substituted Amide Compound in which No Hydrogen Atom is Directly Bonded to a Nitrogen Atom>

The N-substituted amide compound in which no hydrogen atom is directly bonded to a nitrogen atom is an aprotic solvent having a relatively high polarity, and able to uniformly dissolve or disperse the quaternary alkylammonium fluoride and a hydrate thereof in the composition. In the present disclosure, "N-substituted amide compound" also encompasses a urea compound (carbamide compound) in which no hydrogen atom is directly bonded to a nitrogen atom. As the N-substituted amide compound, various compounds can be used without particular limitation, and examples thereof include acyclic N-substituted amides, such as N,N-dimethylformamide, N,N-diethylformamide, N,N-dimethylacetamide, N,N-diethylacetamide, N,N-dimethylpropionamide, N,N-diethylpropionamide, and tetramethylurea; and cyclic N-substituted amides, such as 2-pyrrolidone derivatives, 2-piperidone derivatives, ε-caprolactam derivatives, 1,3-dimethyl-2-imidazolidinone, 1-methyl-3-ethyl-2-imidazolidinone, 1,3-diethyl-2-imidazolidinone, and 1,3-dimethyl-3,4,5,6-tetrahydro-2(1H)-pyrimidinone (N,N'-dimethylpropyleneurea). Among these, a cyclic N-substituted amide is preferably used. The N-substituted amide compound may be one or a combination of two or more thereof.

In one embodiment, the N-substituted amide compound is a 2-pyrrolidone derivative compound represented by the formula (1):

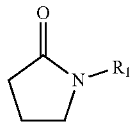

(1)

wherein, in the formula (1), $R^1$ represents an alkyl group having 1 to 4 carbon atoms. Examples of the alkyl group having 1 to 4 carbon atoms include a methyl group, an ethyl group, an n-propyl group, an isopropyl group, an n-butyl group, an isobutyl group, a sec-butyl group, and a t-butyl group. Examples of the 2-pyrrolidone derivative compound represented by the formula (1) include N-methylpyrrolidone, N-ethylpyrrolidone, N-propylpyrrolidone, and N-butylpyrrolidone.

The N-substituted amide compound is preferably a 2-pyrrolidone derivative compound in which $R^1$ is a methyl group or an ethyl group in the formula (1), and more preferably a 2-pyrrolidone derivative compound in which $R^1$ is a methyl group in the formula (1), i.e., N-methylpyrrolidone, since they have relatively high polarity and excellent dissolving ability of the quaternary alkylammonium fluoride, and are easily available.

In one embodiment, the content of the N-substituted amide compound in the decomposing cleaning composition is 70 to 99.99% by mass, preferably 80 to 99.95% by mass, and more preferably 90 to 99.9% by mass. When the decomposing cleaning composition contains an ether compound described later, the total content of the N-substituted amide compound, and the ether compound in the decomposing cleaning composition is preferably 70 to 99.99% by mass, more preferably 80 to 99.95% by mass, and still more preferably 90 to 99.9% by mass.

<(B) Quaternary Alkylammonium Fluoride or Hydrate Thereof>

The quaternary alkylammonium fluoride or a hydrate thereof releases a fluoride ion which is involved in cleavage of an Si—O bond. A quaternary alkylammonium moiety can allow the quaternary alkylammonium fluoride, which is a salt, to dissolve in an aprotic solvent. As the quaternary alkylammonium fluoride, various compounds can be used without any particular limitation. Examples of the hydrate of the quaternary alkylammonium fluoride include trihydrates, tetrahydrates, and pentahydrates. The quaternary alkylammonium fluoride may be one or a combination of two or more thereof.

In one embodiment, the quaternary alkylammonium fluoride is a tetraalkylammonium fluoride represented by $R^6R^7R^8R^9N^+F^-$, wherein $R^6$ to $R^9$ are each independently an alkyl group selected from the group consisting of a methyl group, an ethyl group, an n-propyl group, an isopropyl group, and an n-butyl group. Examples of such a quaternary alkylammonium fluoride include tetramethylammonium fluoride, tetraethylammonium fluoride, tetrapropylammonium fluoride, and tetrabutylammonium fluoride. From the viewpoint of decomposing cleaning performance, availability, prices, etc., it is preferable that the quaternary alkylammonium fluoride be tetrabutylammonium fluoride (TBAF).

In one embodiment, the content of the quaternary alkylammonium fluoride in the decomposing cleaning composition is 0.01 to 10% by mass. The "content of the quaternary alkylammonium fluoride" is a value converted as a mass of only the quaternary alkylammonium fluoride, excluding the mass of hydrate water, when a hydrate of the quaternary alkylammonium fluoride is contained in the composition. The content of the quaternary alkylammonium fluoride in the decomposing cleaning composition is preferably 0.01 to 5% by mass, more preferably 0.05 to 2% by mass, and still more preferably 0.1 to 1% by mass. In another embodiment, the content of the quaternary alkylammonium fluoride in the decomposing cleaning composition is preferably 0.5 to 9% by mass, more preferably 1 to 8% by mass, and still more preferably 2 to 5% by mass. By setting the content of the quaternary alkylammonium fluoride to 0.01% by mass or more, an adhesive polymer can be effectively decomposed and cleaned, and by setting the content to 10% by mass or less, corrosion of a metal portion included in a device forming surface of a device wafer can be prevented or suppressed. The content of the quaternary alkylammonium fluoride in the decomposing cleaning composition may be 4% by mass or less, or 3% by mass or less, when prevention or suppression of corrosion of the metal portion, or reduction in cost associated with the use of the quaternary alkylammonium fluoride is particularly required. When a higher etch rate is required, the content of the quaternary alkylammonium fluoride in the decomposing cleaning composition may be 5% by mass or more, 6% by mass or more, or 7% by mass or more.

<(C) Ether Compound>

The decomposing cleaning composition may comprise an ether compound. By combining the ether compound with the N-substituted amide compound, a mixed solvent system exhibiting high affinity for an adhesive surface can be formed. A composition using such a mixed solvent system can achieve a high etch rate in which the reaction activity of the quaternary alkylammonium fluoride is effectively utilized. As the ether compound, various compounds can be used without particular limitation. The ether compound may be one or a combination of two or more thereof. It is preferable that the ether compound not contain an ester structure or an amide structure.

In one embodiment, the ether compound comprises a dialkyl ether of glycol represented by the formula (2):

$$R^2O(C_nH_{2n}O)_xR^3 \quad (2),$$

wherein, in the formula (2), $R^2$ and $R^3$ each independently represent an alkyl group selected from the group consisting of a methyl group, an ethyl group, a propyl group, an isopropyl group, an n-butyl group, an isobutyl group, a sec-butyl group, and a t-butyl group, n is 2 or 3, and x is an integer of 1 to 4.

Examples of the dialkyl ether of glycol represented by the formula (2) include ethylene glycol dimethyl ether, propylene glycol dimethyl ether, diethylene glycol dimethyl ether, dipropylene glycol dimethyl ether, tripropylene glycol dimethyl ether, tripropylene glycol diethyl ether, tripropylene glycol di(n-butyl) ether, tetraethylene glycol dimethyl ether, and tetrapropylene glycol dimethyl ether. The dialkyl ether of glycol represented by the formula (2) is preferably diethylene glycol dimethyl ether or dipropylene glycol dimethyl ether, from the viewpoint of decomposing cleaning performance, availability, price, etc., and more preferably dipropylene glycol dimethyl ether, since a high etch rate can be obtained with a wide range of composition.

The content of the dialkyl ether of glycol represented by the formula (2) is preferably 10 to 80% by mass, more preferably 15 to 70% by mass, and still more preferably 20 to 60% by mass, with respect to 100% by mass of the total of the N-substituted amide compound, and the ether compound. In another embodiment, the content of the dialkyl ether of glycol represented by the formula (2) is preferably 0 to 60% by mass, more preferably 3 to 50% by mass, and still more preferably 5 to 40% by mass, with respect to 100% by mass of the total of the N-substituted amide compound, and the ether compound.

In one embodiment, the ether compound comprises a dialkyl ether represented by the formula (3):

$$R^4OR^5 \quad (3),$$

wherein, in the formula, $R^4$ and $R^5$ each independently represent an alkyl group having 4 to 8 carbon atoms.

The ether compound may comprise the dialkyl ether of glycol represented by the formula (2), and the dialkyl ether represented by the formula (3). By using two or more types of the ether compounds having different polarities in combination, it is possible to effectively enhance the affinity for various adhesive surfaces to obtain a composition having a wide range of application.

Examples of the dialkyl ether represented by the formula (3) include dibutyl ether, dipentyl ether, dihexyl ether, diheptyl ether, dioctyl ether, butyl hexyl ether, and butyl octyl ether. The dialkyl ether represented by the formula (3) is preferably dibutyl ether, from the viewpoint of decomposing cleaning performance, availability, price, etc.

The content of the dialkyl ether represented by the formula (3) is preferably 0 to 50% by mass, more preferably 1 to 35% by mass, and still more preferably 2 to 30% by mass, with respect to 100% by mass of the total of the N-substituted amide compound, and the ether compound. By setting the content of the dialkyl ether represented by the formula (3) to 0% by mass or more and 50% by mass or less, a higher etch rate can be obtained.

In one embodiment, the content of the N-substituted amide compound is 10 to 90% by mass, and the content of the ether compound is 90 to 10% by mass, with respect to 100% by mass of the total of the N-substituted amide compound, and the ether compound. With respect to 100% by mass of the total of the N-substituted amide compound, and the ether compound, it is preferable that the content of the N-substituted amide compound be 15 to 85% by mass, and the content of the ether compound be 85 to 15% by mass, and it is more preferable that the content of the N-substituted amide compound be 25 to 65% by mass, and the content of the ether compound be 75 to 35% by mass. In another embodiment, it is preferable that the content of the N-substituted amide compound be 40 to 80% by mass, and the content of the ether compound be 60 to 20% by mass, with respect to 100% by mass of the total of the N-substituted amide compound, and the ether compound. By setting the content of the N-substituted amide compound and the ether compound within the above ranges, the quaternary alkylammonium fluoride and the hydrate thereof can be uniformly dissolved in the composition, and a high etch rate can be obtained for various adhesive surfaces.

In one embodiment, with respect to 100% by mass of the total of the N-substituted amide compound, and the ether compound, the content of the N-substituted amide compound is 20 to 90% by mass, the content of the dialkyl ether of glycol represented by the formula (2) is 10 to 80% by mass, and the content of the dialkyl ether represented by the formula (3) is 0 to 30% by mass. It is preferable that the content of the N-substituted amide compound be 25 to 80% by mass, the content of the dialkyl ether of glycol represented by the formula (2) be 20 to 60% by mass, and the content of the dialkyl ether represented by the formula (3) be 0 to 30% by mass. In another embodiment, with respect to 100% by mass of the total of the N-substituted amide compound, and the ether compound, the content of the N-substituted amide compound is 20 to 90% by mass, the content of the dialkyl ether of glycol represented by the formula (2) is 0 to 70% by mass, and the content of the dialkyl ether represented by the formula (3) is 0 to 30% by mass. It is preferable that the content of the N-substituted amide compound be 30 to 85% by mass, the content of the dialkyl ether of glycol represented by the formula (2) be 3 to 50% by mass, and the content of the dialkyl ether represented by the formula (3) be 0 to 30% by mass.

<Additives and Other Ingredients>

The decomposing cleaning composition may contain, as an optional component, additives, such as an antioxidant, a surfactant, a preservative, and an antifoaming agent, within a range not significantly impairing the effect of the present invention.

In one embodiment, the decomposing cleaning composition is substantially free or free of a protic solvent. For example, the content of the protic solvent in the composition may be 5% by mass or less, 3% by mass or less, or 1% by mass or less. The protic solvent that may be contained in the composition may be water derived from the hydrate of the quaternary alkylammonium fluoride.

In one embodiment, the decomposing cleaning composition is substantially free or free of an aprotic solvent selected from ketones and esters. For example, the content of the aprotic solvent selected from ketones and esters in the composition may be 1% by mass or less, 0.5% by mass or less, or 0.1% by mass or less.

In one embodiment, the decomposing cleaning composition is substantially free or free of an antioxidant. For example, the content of the antioxidant in the decomposing cleaning composition may be 1% by mass or less, 0.5% by mass or less, or 0.1% by mass or less. The antioxidant may reduce the activity of a fluoride ion.

[Method for Producing Decomposing Cleaning Composition]

The decomposing cleaning composition is prepared by mixing the N-substituted amide compound, the quaternary alkylammonium fluoride or the hydrate thereof, and other optional components under an inert gas atmosphere. Examples thereof include a method in which the N-substituted amide compound, the quaternary alkylammonium fluoride or the hydrate thereof, and other optional components are stirred and mixed using a stirrer, etc., in a glove box in which an inert gas is enclosed, to dissolve the quaternary alkylammonium fluoride or the hydrate thereof in a solvent. Since the decomposing cleaning composition thus prepared has less dissolved oxygen, the progress of the oxidation of the N-substituted amide compound during storage is slow, and a decrease in etch rate can be suppressed.

In order to further suppress the decrease in etch rate, it is preferable that the prepared decomposing cleaning composition be enclosed in a container under an inert gas atmosphere, that is, the container be filled with an inert gas, and sealed. Thus, dissolution of oxygen in a solvent during storage can be suppressed, and the oxidation of the N-substituted amide compound can be further suppressed. Specifically, there is a method in which an inert gas is introduced into a container, and the container is filled with the decomposing cleaning composition, and after filling, an inert gas is further introduced into a gas phase in the container to be sealed. Further, there is a method in which a supply nozzle of the decomposing cleaning composition and an exhaust nozzle are inserted into a sealed container substituted with an inert gas, and the container is filled with the decomposing cleaning composition while evacuating the inert gas in the container. Further, in order to purge dissolved oxygen, it is more preferable to carry out bubbling with nitrogen gas.

The oxygen concentration in the inert gas atmosphere is preferably 0.1% by volume or less, more preferably 0.05% by volume or less, and still more preferably 0.01% by volume or less.

The inert gas is preferably argon gas or nitrogen gas, and more preferably nitrogen gas.

[Method for Using Decomposing Cleaning Composition]

The composition of the present disclosure can be used as a decomposing cleaning composition of an adhesive polymer contained in various adhesives. The adhesive polymer is not particularly limited as long as it can be cleaned by using the decomposing cleaning composition of the present disclosure. In addition to the adhesive polymer, the adhesive may contain, as an optional component, a curing agent, a curing accelerator, a crosslinking agent, a surfactant, a leveling agent, a filler, etc.

In one embodiment, the adhesive polymer includes an Si—O bond. The adhesive polymer is reduced in molecular weight or loses its crosslinked structure due to cleavage of an Si—O bond by a fluoride ion of the quaternary alkylammonium fluoride, so that it can be dissolved in the solvent, and as a result, the adhesive polymer can be removed from a surface, such as that of a device wafer.

The adhesive polymer including an Si—O bond is preferably a polyorganosiloxane compound. Since the polyorganosiloxane compound includes a large number of siloxane (Si—O—Si) bonds, it can be effectively decomposed and cleaned by using the decomposing cleaning composition. Examples of the polyorganosiloxane compound include silicone elastomers, silicone gels, and silicone resins, such as MQ resins, and modified products thereof, such as epoxy-modified products, acrylic-modified products, methacrylic-modified products, amino-modified products, and mercapto-modified products thereof. The polyorganosiloxane compound may be a silicone-modified polymer, such as a silicone-modified polyurethane, and a silicone-modified acrylic resin.

In one embodiment, the adhesive polymer is an addition-curable silicone elastomer, a silicone gel, or a silicone resin. These addition-curable silicones contain an ethylenically unsaturated group-containing polyorganosiloxane, such as a vinyl-terminated polydimethylsiloxane or a vinyl-terminated MQ resin, and a polyorganohydrosiloxane, such as a polymethylhydrosiloxane, as a crosslinking agent, and are cured by using a hydrosilylation catalyst, such as a platinum catalyst.

In another embodiment, the adhesive polymer includes an aralkyl group-, epoxy group-, or phenyl group-containing polydiorganosiloxane, in particular, an aralkyl group-, epoxy group-, or phenyl group-containing polydimethylsiloxane. An adhesive containing such an adhesive polymer may be used for temporary bonding, in combination with an adhesive containing the addition-curable silicone described above.

EXAMPLES

Hereinafter, the present invention will be described in more detail based on the Examples, but the present invention is not limited by the Examples.

Preparation of Decomposing Cleaning Compositions

Example 1

In a glove box in which nitrogen gas is enclosed, 2.281 g of tetrabutylammonium fluoride trihydrate (TBAF3·$H_2O$) (98%) was added to a 125 mL polyethylene container, and then 34.410 g of N-methylpyrrolidone (NMP) was added and mixed to dissolve TBAF3·$H_2O$. In this way, a decomposing cleaning composition of 5.0% by mass TBAF was prepared. The decomposing cleaning composition was stored in the polyethylene container, which was filled with nitrogen gas and sealed.

Example 2

In a glove box in which nitrogen gas is enclosed, 9.097 g of tetrabutylammonium fluoride trihydrate (TBAF3·$H_2O$) (98%) was added to a 125 mL polyethylene container, and 67.467 g of N-methylpyrrolidone (NMP), 6.687 g of dipropylene glycol dimethyl ether (hereinafter referred to as "DPGDME"), and 12.666 g of dibutyl ether (DBE) were added in this order and mixed to dissolve TBAF3·$H_2O$. In this way, a decomposing cleaning composition of 7.7% by mass TBAF mixed solvent was prepared in which the mass ratio of NMP:dipropylene glycol dimethyl ether:dibutyl ether was 0.777:0.077:0.146. The decomposing cleaning composition was stored in the polyethylene container, which was filled with nitrogen gas and sealed.

Example 3

Except that the compositions were changed as shown in Table 3, a decomposing cleaning composition was prepared in the same manner as in Example 2.

Comparative Examples 1 to 3

Except that the compositions were changed as shown in Tables 1 to 3, and weighing and mixing were carried out in air, decomposing cleaning compositions were prepared in the same manner as in Example 1 or 2. The prepared decomposing cleaning compositions were stored in the polyethylene container, which was filled with air and sealed.

Method for Preparing a Silicon Wafer Test Piece Having an Adhesive Layer Containing a Polyorganosiloxane Compound On a 12 inch (300 mm) silicon wafer (770 μm thick), an addition-curable silicone resin was applied by spin coating so as to have a dry film thickness of 110 μm. Thereafter, an adhesive layer was formed on the silicon wafer by heating on a hot plate at 140° C. for 15 minutes and at 190° C. for 10 minutes. The silicon wafer having the adhesive layer was divided into test pieces each having a size of 4 cm×4 cm, and the thickness of the center portion of the test piece was measured using a micrometer.

Cleaning Test 7.0 mL of the decomposing cleaning composition immediately after preparation (within 30 minutes after preparation) was taken out of the mixing tank, and added to a 90 mm diameter SUS petri dish. One test piece was immersed in the decomposing cleaning composition, and the petri dish was shaken back and forth at a frequency of 1 Hz for 5 minutes at room temperature (25° C.). After the immersion, the test piece was removed by using tweezers, immersed in isopropyl alcohol (IPA), and further rinsed thoroughly by using an IPA wash bottle. Thereafter, the test piece was immersed in ion-exchanged water (DIW) and thoroughly rinsed by using a DIW wash bottle in the same manner. After spraying nitrogen gas to the test piece to dry water attached thereon, the test piece was heated and dried in a dryer at 125° C. for 30 minutes. The thickness of the center portion of the test piece after drying was measured using a micrometer.

The etch rate (ER) of the decomposing cleaning composition was calculated by dividing the difference in the thicknesses of the test piece before and after immersion by the immersion time (5 minutes) in the decomposing cleaning composition.

Etch rate (ER) (μm/min)=[(thickness of test piece before immersion−thickness of test piece after immersion, washing and drying) (μm)]/immersion time (min)

The cleaning test was carried out in the same procedure on a decomposing cleaning composition which has been stored at normal temperature in a nitrogen gas atmosphere or an air atmosphere until a certain number of days have passed after preparation, and the etch rate was calculated. The results are shown in Tables 1 to 3. In Tables 1 to 3, the retention rate represents the retention rate of the etch rate when the etch rate immediately after preparation (within 30 minutes after preparation) under a nitrogen gas atmosphere is taken as 1.00.

TABLE 1

| Number of days for storage after preparation [Days] | Example 1<br>5.0% by mass TBAF/NMP<br>Nitrogen gas atmosphere<br>Etch rate (μm/min) | Example 1<br>Retention rate | Comparative Example 1<br>5.0% by mass TBAF/NMP<br>Air atmosphere<br>Etch rate (μm/min) | Comparative Example 1<br>Retention rate |
|---|---|---|---|---|
| 0 | 6.6 | 1.00 | 6.4 | 0.97 |
| 12 | 5.8 | 0.88 | 4.4 | 0.67 |
| 20 | — | — | 4.2 | 0.64 |
| 32 | 5.0 | 0.76 | 3.6 | 0.55 |

TABLE 2

| Number of days for storage after preparation [Days] | Example 2<br>7.7% by mass TBAF/(NMP/DPGDME/DBE = 0.777/0.077/0.146)<br>Nitrogen gas atmosphere<br>Etch rate (μm/min) | Example 2<br>Retention rate | Comparative Example 2<br>7.7% by mass TBAF/(NMP/DPGDME/DBE = 0.777/0.077/0.146)<br>Air atmosphere<br>Etch rate (μm/min) | Comparative Example 2<br>Retention rate |
|---|---|---|---|---|
| 0 | 9.2 | 1.00 | 8.8 | 0.96 |
| 7 | 9.0 | 0.98 | 8.6 | 0.93 |
| 35 | 9.0 | 0.98 | 8.2 | 0.89 |
| 69 | — | — | 8.0 | 0.87 |
| 150 | — | — | 7.6 | 0.83 |
| 151 | 8.4 | 0.91 | — | — |
| 230 | — | — | 6.8 | 0.74 |
| 307 | 8.4 | 0.91 | — | — |

TABLE 3

| | Example 3 | | Comparative Example 3 | |
|---|---|---|---|---|
| Number of days for storage after preparation [Days] | 5.0% by mass TBAF/ (NMP/DPGDME = 0.764/0.236) | | 5.0% by mass TBAF/ (NMP/DPGDME = 0.764/0.236) | |
| | Nitrogen gas atmosphere | | Air atmosphere | |
| | Etch rate (μm/min) | Retention rate | Etch rate (μm/min) | Retention rate |
| 0 | 7.8 | 1.00 | 7.4 | 0.95 |
| 76 | 6.6 | 0.85 | 6.2 | 0.79 |
| 120 | 6.4 | 0.82 | 5.8 | 0.74 |
| 191 | 6.4 | 0.82 | 5.2 | 0.67 |
| 254 | 6.6 | 0.85 | — | — |
| 306 | 6.6 | 0.85 | — | — |

The decomposing cleaning compositions of Examples 1 to 3 exhibited higher retention rates of the etch rates, as compared with the decomposing cleaning compositions of Comparative Examples 1 to 3, respectively.

INDUSTRIAL APPLICABILITY

The method for producing the decomposing cleaning composition of the present disclosure can be used for producing and storing a composition for decomposing and cleaning a residue of an adhesive used in a thinning process of a semiconductor wafer, in particular, an adhesive including a polyorganosiloxane compound as an adhesive polymer, on a device wafer.

The invention claimed is:

1. A method for producing a decomposing cleaning composition comprising (A) an N-substituted amide compound in which no hydrogen atom is directly bonded to a nitrogen atom, and (B) a quaternary alkylammonium fluoride or a hydrate thereof, the method comprising:

a preparation step of mixing the (A) and the (B) under an inert gas atmosphere, and an encapsulation step of enclosing the prepared decomposing cleaning composition in a container under an inert gas atmosphere after the preparation step.

2. The method for producing the decomposing cleaning composition according to claim 1, wherein the decomposing cleaning composition further comprises (C) an ether compound, and wherein the method comprises a preparation step of mixing the (A) to the (C) under an inert gas atmosphere, and an encapsulation step of enclosing the prepared decomposing cleaning composition in a container under an inert gas atmosphere after the preparation step.

3. The method for producing the decomposing cleaning composition according to claim 1, wherein the inert gas in the preparation step is nitrogen gas.

4. The method for producing the decomposing cleaning composition according to claim 2, wherein the (C) ether compound comprises a dialkyl ether of glycol selected from diethylene glycol dimethyl ether, dipropylene glycol dimethyl ether, tripropylene glycol dimethyl ether, tripropylene glycol diethyl ether, tripropylene glycol di(n-butyl) ether, tetraethylene glycol dimethyl ether, and tetrapropylene glycol dimethyl ether.

5. The method for producing the decomposing cleaning composition according to claim 1, wherein the inert gas in the encapsulation step is nitrogen gas.

6. The method for producing the decomposing cleaning composition according to claim 1, wherein the (A) N-substituted amide compound is a 2-pyrrolidone derivative compound represented by formula (1):

(1)

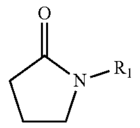

wherein, in formula (1), $R^1$ represents an alkyl group having 1 to 4 carbon atoms.

7. The method for producing the decomposing cleaning composition according to claim 6, wherein the (A) N-substituted amide compound is a 2-pyrrolidone derivative compound wherein $R^1$ in formula (1) is a methyl group or an ethyl group.

8. The method for producing the decomposing cleaning composition according to claim 2, wherein the (C) ether compound comprises a dialkyl ether of glycol represented by formula (2):

$$R^2O(C_nH_{2n}O)_xR^3 \quad (2),$$

wherein, in formula (2), $R^2$ and $R^3$ each independently represent an alkyl group selected from the group consisting of a methyl group, an ethyl group, a propyl group, an isopropyl group, an n-butyl group, an isobutyl group, a sec-butyl group, and a t-butyl group, n is 2 or 3, and x is an integer of 1 to 4.

9. The method for producing the decomposing cleaning composition according to claim 8, wherein the dialkyl ether of glycol is dipropylene glycol dimethyl ether.

10. The method for producing the decomposing cleaning composition according to claim 2, wherein the (C) ether compound comprises a dialkyl ether represented by formula (3):

$$R^4OR^5 \quad (3),$$

wherein, in the formula, $R^4$ and $R^5$ each independently represent an alkyl group having 4 to 8 carbon atoms.

11. The method for producing the decomposing cleaning composition according to claim 10, wherein the dialkyl ether is dibutyl ether.

12. The method for preparing the decomposing cleaning composition according to claim 1, wherein the (B) quaternary alkylammonium fluoride is a tetraalkylammonium fluoride represented by $R^6R^7R^8R^9N^+F^-$, wherein $R^6$ to $R^9$ are each independently an alkyl group selected from the group consisting of a methyl group, an ethyl group, an n-propyl group, an isopropyl group, and an n-butyl group.

13. The method for producing the decomposing cleaning composition according to claim 1, wherein the decomposing cleaning composition is a decomposing cleaning composition for an adhesive polymer.

14. The method for producing the decomposing cleaning composition according to claim 13, wherein the adhesive polymer is a polyorganosiloxane compound.

15. The method for producing the decomposing cleaning composition according to claim 2, wherein the (A) N-substituted amide compound is a 2-pyrrolidone derivative compound represented by formula (1):

(1)

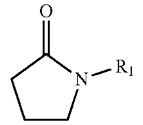

wherein, in formula (1), $R^1$ represents an alkyl group having 1 to 4 carbon atoms.

16. The method for producing the decomposing cleaning composition according to claim 4, wherein the (A) N-substituted amide compound is a 2-pyrrolidone derivative compound represented by formula (1):

(1)

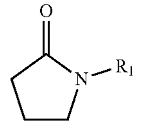

wherein, in formula (1), $R^1$ represents an alkyl group having 1 to 4 carbon atoms.

17. The method for producing the decomposing cleaning composition according to claim 8, wherein the (C) ether compound comprises a dialkyl ether represented by formula (3):

$$R^4OR^5 \quad (3),$$

wherein, in the formula, $R^4$ and $R^5$ each independently represent an alkyl group having 4 to 8 carbon atoms.

18. The method for producing the decomposing cleaning composition according to claim 4, wherein the (C) ether compound comprises a dialkyl ether represented by formula (3):

$$R^4OR^5 \quad (3),$$

wherein, in the formula, $R^4$ and $R^5$ each independently represent an alkyl group having 4 to 8 carbon atoms.

* * * * *